US005435948A

United States Patent [19]

Staffolani et al.

[11] Patent Number: 5,435,948

[45] Date of Patent: Jul. 25, 1995

[54] SURFACE TREATMENT OF REFRACTORIES

[75] Inventors: René Staffolani, Freyming-Merlebach, France; Jean-Pierre Meynckens, Villers-Perwin, Belgium

[73] Assignee: Fosbel International Ltd., Birmingham, United Kingdom

[21] Appl. No.: 97,198

[22] Filed: Jul. 27, 1993

[30] Foreign Application Priority Data

Jul. 31, 1992 [GB] United Kingdom ........... 92 16 348.4

[51] Int. Cl.[6] ........................... C21B 7/06; F27D 1/16; B32B 35/00

[52] U.S. Cl. ........................................ 264/30; 156/98; 264/80; 264/265; 266/44; 266/281

[58] Field of Search ....................... 264/30, 36, 35, 80, 264/265; 156/98; 266/281, 44

[56] References Cited

U.S. PATENT DOCUMENTS

| | | | |
|---|---|---|---|
| 936,981 | 10/1909 | Blautigam | 264/39 |
| 3,365,523 | 1/1968 | Stresino | 264/30 |
| 4,017,960 | 4/1977 | Kawabe et al. | 264/30 X |
| 4,487,397 | 12/1984 | Antonov et al. | 266/281 |
| 4,871,211 | 10/1989 | Aussel | 266/281 X |
| 4,875,662 | 10/1989 | Head et al. | 266/281 X |
| 5,002,910 | 3/1991 | Robyn | 264/30 X |
| 5,100,594 | 3/1992 | Zvosec et al. . | |
| 5,202,090 | 4/1993 | Zvosec et al. . | |
| 5,270,075 | 12/1993 | Robyn et al. . | |

FOREIGN PATENT DOCUMENTS

| | | | |
|---|---|---|---|
| 6722 | 2/1974 | Japan | 266/281 |
| 181306 | 11/1982 | Japan | 264/30 |
| 6869 | 2/1983 | Japan | 266/281 |
| 1330894 | 9/1973 | United Kingdom . | |
| 2035524A | 6/1980 | United Kingdom . | |
| 2170122A | 7/1986 | United Kingdom . | |
| 2170191A | 7/1986 | United Kingdom . | |
| 2213919B | 8/1989 | United Kingdom . | |
| 2234502A | 2/1991 | United Kingdom . | |
| 973626 | 11/1982 | U.S.S.R. | 264/30 |

*Primary Examiner*—Karen Aftergut

*Attorney, Agent, or Firm*—Spencer, Frank & Schneider

[57] ABSTRACT

A process for cleaning a surface of a refractory structure which is at an elevated temperature, including projecting against the surface a comburent gas stream which is a powder stream including fuel particles carried in an oxygen-containing carrier gas the comburent gas stream impinging upon the surface at an impingement zone, whereby the fuel particles are caused or allowed to burn in a reaction zone defined generally around the impingement zone and the heat generated by the combustion of the fuel particles causes the surface or material adhered thereto to melt and provide a melted material, and projecting a scouring stream including oxygen simultaneously or alternately at the surface to scour the surface in the vicinity of the reaction zone and thereby clean the surface due to the scouring stream blowing away the melted material.

13 Claims, 1 Drawing Sheet

SURFACE TREATMENT OF REFRACTORIES

BACKGROUND OF THE INVENTION

1. Field of the invention

This invention relates to a process of cleaning a refractory structure, in particular as a stage in the repair of damaged refractory structures.

Refractory structures of various types, such as metallurgical furnaces, coke ovens and glass melting furnaces tend to become dirty, corroded or damaged during the course of their working lives.

Damage may for example be manifest as slippage of one or more refractory blocks in relation to the main structure which results in an irregular surface profile, or as cracking of the refractory structure. It is in general desirable to re-establish the designed surface profile of the refractory structure, and it is also desirable to prevent further slippage of the block(s) in question and to fill any gap left by its or their displacement or cracking. In order to achieve these ends, it may be necessary or desirable to cut away any protruding portion of the refractory structure. Alternatively or in addition it may be necessary or desirable to cut a keyway into a slipped block and/or a neighbouring block so that a key may be formed in or inserted into the keyway to prevent further slippage. Alternatively or in addition, it may be necessary or desirable to enlarge or shape any gap left by such slippage or cracking for the formation or insertion of a suitable plug.

Damage may alternatively be due to erosion of the material of the refractory structure. Such erosion tends to impart an irregular surface profile to the structure and it is often desirable to modify that surface profile before effecting a repair to the structure.

A refractory structure may become polluted and corroded by materials which adhere thereto, for example slag, glass, mineral residues, sulphides and sulphates.

A refractory structure could of course be cleaned mechanically, for example by spraying of gas or liquid under pressure, by sand blasting, or by treatment with ultra-sound. In certain cases where the material is sublimable or combustible, one may achieve cleaning with a torch (in the case of coke ovens for example). In other cases where it is necessary to dress or rectify the surface, one may use for example using a cutting wheel, drill or other tool, but all these techniques present certain disadvantages for subsequent refractory repair. In order to clean a refractory structure or equipment and leave a surface suitable for good quality production or for subsequent repair, the operator would usually have to approach the cleaning site quite closely, and this implies that that site would have to be at a temperature which the operator could tolerate for the time necessary to effect the cleaning. This in turn implies that the refractory structure would have to be cooled from its normal operating temperature, or a temperature which is within its normal working cycle of operating temperatures. And it would have to be re-heated after cleaning and repair. In the case of industrial furnaces of various types, in order to avoid damage to the furnace as its refractory material contracts or expands, such cooling and re-heating might have to be scheduled over a period of several days or even a few weeks, and this would accordingly represent a considerable loss in production from that furnace.

2. Description of related art

A process is known from British patent specification GB 2213919-A (Glaverbel) for dressing a refractory structure, which is at an elevated temperature, wherein a comburent gas stream carrying a mixture of particles which comprises particles of one or more elements which is or are oxidisable to form one or more refractory oxides (hereinafter called "fuel particles") and refractory oxide particles, is projected against the site to be prepared and the fuel particles are caused or allowed to bum, the said mixture further incorporating a fluxing agent, such as fluorides or alkali metal salts, the fluxing action of which is such that under the heat released by combustion of the fuel particles, the refractory structure becomes softened to an extent such that the structure becomes dressed by removal or displacement of material thereof under the mechanical action of the impinging stream.

The process of GB 2213919-A is useful simply for trimming a refractory structure, or for cutting a hole therein. The process may be performed as a preliminary step in certain refractory repair processes, and particularly such repair processes as those which are themselves capable of being carried out at or near the normal operating temperature of a refractory structure.

One such repair technique has become known as ceramic welding. This type of process is illustrated by British Patent No 1,330,894 and British patent specification GB 2 170 191 A (both in the name of Glaverbel). In such ceramic welding processes, a coherent refractory mass is formed on a surface by projecting against the surface a mixture of refractory particles and fuel particles, together with oxygen. The fuel particles used are particles whose composition and granulometry are such that they react exothermically with the oxygen to result in the formation of refractory oxide and release the heat required to melt at least the surfaces of the projected refractory particles.

In the ceramic welding process as practised, a mixture of refractory particles and fuel particles (the "ceramic welding powder") is conveyed from a powder store along a feed line to a lance from which it is projected against a target surface. The gas which leaves the lance outlet with the ceramic welding powder ("the carrier gas") may be pure (commercial grade) oxygen, or it may comprise a proportion of a substantially inert gas such as nitrogen, or indeed some other gas.

We have found that when a refractory structure is treated in accordance with the teaching of GB 2213919-A, the surface of that structure is of modified composition. This is because not all of the softened material is removed from that surface, and that softened material includes material which was projected in the dressing operation. If one requires a surface to be free from foreign material, it is necessary to adopt an alternative process. In addition, fluxing agent may remain on the treated surface. Because of the presence of the fluxing agent on the surface of the refractory structure, subsequent ceramic welding may lead to a repair which is weakened and may not adhere well to the refractory structure, for example in the case of high grade refractories used at high temperature.

SUMMARY OF THE INVENTION

It is an object of this invention to provide a process of cleaning a refractory structure which can be performed without the need for cooling of such a structure from a temperature which it is at during its normal operation, so avoiding the necessity of such lengthy cooling and re-heating periods without significantly leaving any residual foreign material.

According to the present invention, there is provided a process for cleaning the surface of a refractory structure at an elevated temperature, which process comprises projecting against said surface a comburent gas stream carrying fuel particles in an oxygen-containing carrier gas (hereinafter called a "powder stream"), whereby the fuel particles are caused or allowed to burn in an impingement zone at said surface (hereinafter called a "reaction zone"), characterised by simultaneously or alternately projecting at said surface a scouring stream comprising oxygen to scour said surface in the vicinity of the reaction zone.

The heat generated by the combustion of particles causes the surface, or the material adhered thereto, to melt and the scouring gas blows away the melted material.

The present invention thus provides a process of cleaning a refractory structure which can be performed without any requirement to take positive steps to effect substantial and deliberate cooling of the structure from a temperature which it is at during its normal operation, so avoiding the necessity of lengthy cooling and reheating periods, and thus avoiding or reducing problems which might arise due to contraction or expansion of the refractory material. By "cleaning" is meant the removal of material on the desired area of the refractory structure, as well as the removal of some of the refractory material itself, when needed. In this sense therefore, the term "cleaning" also includes the "dressing" referred to in the art. For example it is usually possible to work in such a manner that the refractory structure does not require to be cooled and reheated through any transition point on the dilatometric curve of the material from which it is formed. Indeed, the higher the temperature of the refractory structure, the more efficient is the process of this invention. We prefer that the temperature of the refractory surface is greater than 700° C., especially greater than 1000° C.

The process has the particular advantage of being easily usable for cleaning structures which are of a rather high grade refractory, and/or which are at an elevated temperature which is nevertheless rather low in relation to the maximum tolerable operating temperature of the grade of refractory of which they are made.

There are various oxygen containing gases which may be projected in order to form the required scouring gas, and the optimum choice of gas will depend on circumstances. While oxygen may be used in admixture with carbon dioxide or nitrogen for forming the scouring gas, a preferred embodiment of the invention provides that the scouring gas consists predominantly of oxygen. The use of commercial grade oxygen is preferred: such oxygen will ordinarily be present for use as the carrier gas anyway, and it is more efficient for the purpose in view. Since the scouring gas comprises oxygen, it avoids smothering of the combustion in the reaction zone, and this facilitates complete combustion of the fuel particles used. However, it will be borne in mind that the carrier gas itself usually contains at least sufficient oxygen for substantially complete combustion of the fuel.

It is convenient that the powder stream and the scouring stream are projected towards said surface by discharge from a common lance. The gas may impact in the reaction zone itself, but in preference in the vicinity thereof. When the lance is moved over the surface, the impact zone of the scouring gas preferably immediately follows the reaction zone. Preferably, the scouring stream comprises a plurality of discrete streams located about the powder stream. The streams of gas may be projected simultaneously or alternately. For example, if the lance is moved back and forth over the surface to be cleaned, that scouring gas stream which follows the powder stream may be turned on while the opposite scouring gas stream, which would lead the powder stream, is turned off. The plurality of discrete streams may conveniently be achieved by projecting the scouring stream from a multiplicity of outlets in the lance arranged in the vicinity of one or more powder discharge outlet(s).

The scouring gas may be projected towards the surface of the refractory structure continuously, or in an intermittent manner, while the powder is supplied continuously.

The discharge velocity of the scouring gas is greater than that of the carrier gas. The adoption of this feature generates a disturbance of the flow pattern of the material in the reaction zone.

The scouring gas is preferably cold. The use of cold gas projected towards the reaction zone which otherwise requires a temperature as high as possible for melting the refractory material is surprising, since one might expect the cold gas to cause the molten material to solidify rather than be removed.

In addition to the scouring gas, a powder stream comprising fuel particles in an oxygen containing carrier gas is projected at the surface of the refractory structure.

Various elements may be used as fuel, especially elements capable of producing refractory oxides, to remove the risk of impairing the refractory properties of the treated surface. Thus the fuel may be selected from magnesium and zirconium, but it is preferred that said fuel particles comprise particles of aluminium and/or silicon, since these elements give a good compromise between efficacy, ease and safety of use and cost. It is especially preferred to use a mixture of aluminium and silicon particles, preferably one in which there is more silicon than aluminium. The ammonium which is more easily ignitable serves to maintain a reaction zone in which the silicon burns and the combined heat generated can be sufficient for the purposes in view. According to a preferred embodiment of the invention, the fuel particles are formed of such a material that reacts with the oxygen at said surface to form a refractory oxide with a chemical composition corresponding to that of the refractory structure.

The granulometry of the particles in the comburent gas stream has a very important effect on the way the combustion reactions take place whether during cleaning of a refractory structure. We have found that it is desirable to make use of very finely divided fuel particles.

Preferably, the average grain size of said fuel particles is not more than 50 μm, and advantageously, at least 80% by weight of said fuel particles have a grain size below 50 μm. It is preferred that the average grain size of said fuel particles is not more than 30 μm, and for optimum results, at least 80% by weight of said fuel particles have a grain size below 30 μm.

The expression "average grain size" is used herein, as is conventional in the ceramic welding art, to denote a size such that 50% (by weight, rather than by number) of the particles have a size smaller than that average.

It is usual that the powder stream will contain particles in addition to the fuel particles. These particles will generally be refractory oxide particles. The presence of these further particles augments the fluid mass and facilitates its flow, especially if fluxing agents are present. Also, the further particles may add to the mechanical erosion effect of the impact of the powder stream on the refractory structure. This also enables a mixture of powders to be used which mixture is similar to the composition of powder to be used for a subsequent ceramic welding repair of the refractory structure. The choice of refractory oxide particles for the projected mixture is not especially critical, since it is all removed by the scouring gas. In preference one therefore chooses a material which will be used in a following ceramic welding operation, thereby to reduce the number of raw materials required. In order to reduce problems which may be encountered due to differential thermal expansion or contraction at the interface between the refractory structure and a weld deposit, it is generally desirable that the composition of the surface of the structure and the weld deposit should be of broadly similar chemical composition. This also gives chemical compatibility between the deposit and the structure. In order to promote adherence and compatibility, it is preferred that said refractory oxide particles comprise particles of at least the major constituent(s) of the refractory structure.

In preferred embodiments of process according to the invention, the refractory particles are selected from oxides of at least one of aluminium, chromium, magnesium, silicon and zirconium.

Preferably, the maximum grain size of said refractory oxide particles is not more than 4 mm, and advantageously, at least 80% by weight of said refractory oxide particles have a grain size below 2 mm.

The optimum amount of fuel particles to be incorporated in the particulate mixture will depend on the working conditions. For a given refractory operating temperature, it is generally desirable to incorporate more fuel the higher is the grade of the refractory. Likewise, for a given refractory, it is desirable to incorporate more fuel the lower is the operating temperature at the cleaning site. Generally, the mixture used for cleaning has a higher fuel content than is present in a mixture used for ceramic welding.

Advantageously, the powder stream comprises at least 20% by weight of fuel particles, based on the solid content thereof. This represents a satisfactory compromise between the amount of fuel to be incorporated and the length of time for which the reaction zone has to be positioned over the site being cleaned. It will of course be appreciated that more fuel may be required for acting on low temperature, high grade refractories, and that less may be required when operating on high temperature, low grade refractories.

In general, we have found that in order to achieve a satisfactory cleaning, it is quite sufficient to incorporate fuel in the projected mixture in amounts of up to 30% by weight. Advantageously, said fuel particles are present in a proportion not exceeding 30% by weight of the projected mixture of particles. This has the advantage of economy, since the fuel particles are the most expensive part of the projected mixtures. Also we have found that the incorporation of excessive amounts of fuel particles may unjustifiably increase the risk that the reaction generated could propagate back along the projection apparatus.

The powder mixture may contain particles of a material other than fuel or refractory material, for example peroxides or a fluxing agent and in particular fluxing agents according to GB 2213919-A referred to above. This is of advantage if both cleaning and dressing are required.

A suitable lance for use in the process of the invention comprises one or more outlets for the discharge of the powder stream together with one or more outlets for the scouring gas, to discharge the scouring gas in a direction substantially parallel to the powder stream(s). In a preferred embodiment, a number of discrete scouring gas outlets are positioned in such a manner as to produce a number of discrete scouring gas streams located about the powder stream. By the provision of this feature, the scouring gas strikes the surface of the refractory structure in the vicinity of the reaction zone. As the lance is moved over the surface of the refractory structure, the scouring gas cleans the surface which has been heated in the reaction zone.

In some preferred embodiments of the invention, the gas streams are discharged from a lance which is cooled by fluid circulating through it. Such cooling may easily be achieved by providing the lance with a water jacket. Such a water jacket may be located to surround a central tube or tubes for the feed of powder stream, while being itself surrounded by a passage or passages for the conveyance of scouring gas. Alternatively, or in addition, there may be a water jacket which surrounds all the gas discharge tubes of the lance. In either case, the temperature of the scouring gas discharged will be, in general, and when considering the repair of furnaces at substantially their operating temperature, considerably lower than the environmental temperature within the furnace, and it may be at a temperature which is broadly similar to that of the carrier gas.

A lance suitable for use in the process of the invention is simple and makes it possible readily to form a scouring gas in the vicinity of the zone of the impact of the carrier gas stream and entrained powder discharged from the powder outlet.

Some preferred embodiments of the lance are primarily intended for small to moderate scale maintenance, or situations where larger surfaces are to be cleaned but the time available for cleaning is not critical, and the particles are projected from a lance having a single carrier gas outlet having a diameter of between 8 mm and 25 mm$^2$. The cross sectional area of such outlets will thus be between 50 and 500 mm$^2$. Such lances are suitable for projecting powder at rates of 30 to 300 kg/h, and may therefore be also used for ceramic welding under the same conditions, by adjusting the composition of the powder. The outlet(s) for the scouring gas stream(s) has (have) preferably a diameter of from 5 to 10 mm, less than the diameter of the powder stream outlet.

Other preferred embodiments of the lance are primarily intended for large scale repairs which must be effected in a short time, and the particles are projected from a lance having a carrier gas outlet having a cross sectional area of between 300 and 2,300 mm$^2$. Such lances are suitable for projecting powder at rates of up to 1000 kg/h, or even more and possibly also being utilised for the ceramic welding. Instead of a number of discrete streams of scouring gas, one may use a scouring gas stream having the form of the arc of a circle arranged about the powder stream.

The scouring gas may be discharged from orifices disposed in a line parallel to a line of powder stream discharge orifices, such as where the lance has a comb-like structure for the treatment of large surfaces. However, by preference, the scouring gas may be discharged from a group of spray orifices disposed around a central powder outlet. This arrangement is simpler and lighter.

The lance may be straight, or alternatively it may be shaped for ease of use in confined spaces.

The present invention also provides a ceramic welding process in which a coherent refractory mass is formed adherent to a refractory structure at a weld site by projecting a powder stream carrying a mixture fuel particles and refractory oxide particles against the site of the weld and the fuel particles are caused or allowed to bum to soften or melt at least the surfaces of the refractory oxide particles so that a said coherent refractory mass is formed adherent to said structure, characterised in that in a preliminary treatment step, the weld site is cleaned by a refractory cleaning process as herein defined.

In general it is recommended to project the particles in the presence of a high concentration of oxygen, for example using commercial grade oxygen as carrier gas. Because of the very high temperatures in the ceramic welding reaction zone, a sufficient melting or softening of the refractory particles can be achieved, and it is thus possible to form a highly coherent refractory mass with good refractoriness.

A particular advantage of ceramic welding processes is that they can be performed on the refractory structure while it is substantially at its normal hot working temperature. This has obvious benefits in that the "down time" of the structure being repaired can be minimised, as can any problems due to thermal contraction and expansion of the refractory. Welding at a temperature close to the working temperature of the refractory structure also has benefits for the quality of the weld formed. The welding reactions tend to be able to soften or melt the surface of the structure, so that a good joint is made between the surface being treated and the newly formed refractory weld mass.

Indeed it is particularly convenient for the mixture of particles projected in the ceramic welding step to have substantially the same composition as that projected in the refractory cleaning step save that in the ceramic welding step, the level of fuel therein is reduced. Thus for example, the particulate mixture to be projected in the refractory cleaning step may be made simply by adding an appropriate quantity of further fuel to a quantity of a mixture of particles having the same composition as the mixture which is to be used in the ceramic welding step.

BRIEF DESCRIPTION OF THE DRAWINGS

Preferred embodiments of the invention will now be described in greater detail by way of example only, with reference to the accompanying drawing, in which.

Figure 1:
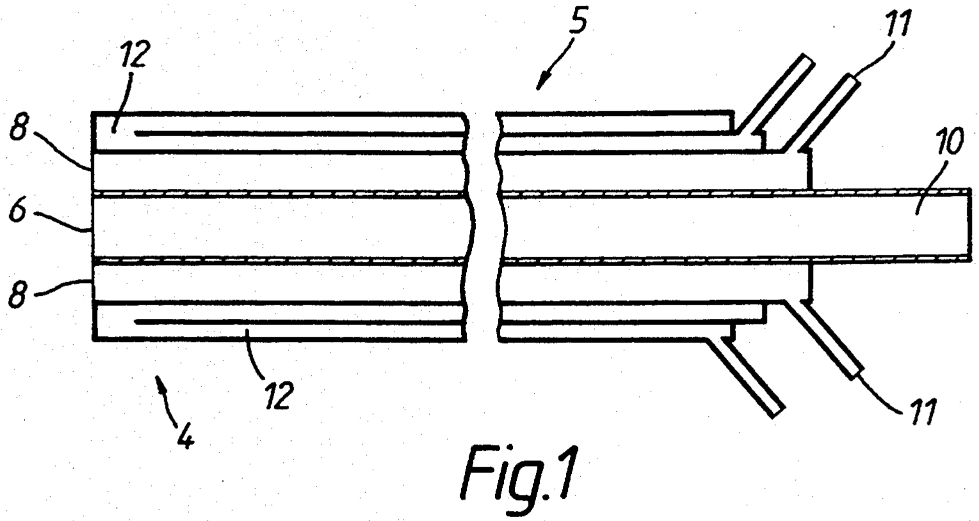
FIG. 1 is a diagrammatic and partial section through a spray lance suitable for use in the process of the invention.
Figure 2:
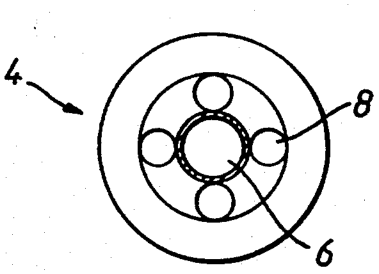
FIG. 2 is a view of the discharge end of the lance shown in FIG. 1.

In the Figures, the spray head 4 of the lance 5 comprises a central outlet 6 for spraying the powder stream comprising the fuel particles dispersed in the carrier gas. In place of a single central outlet 6, the lance may comprise a group of several outlets for spraying the powder stream. A spray lance comprising an outlet group of this type is disclosed and claimed for instance in Glaverbel's British Patent Specification 2,170,122. The lance head 4 also comprises, in accordance with the invention, scouring gas projecting means. In the embodiment shown in the Figures, the scouring gas projecting means comprise four outlets 8 which as a group surround the central outlet 6 in order to spray four substantially discrete scouring gas streams. The mixture of particles, dispersed in the carrier gas, is introduced via the supply tube 10 and the oxygen for the scouring gas jet via the duct 11. The lance 5 also comprises an external water jacket 12 with a cooling water inlet and outlet.

DESCRIPTION OF THE PREFERRED EMBODIMENTS

Example 1

In a glass melting furnace, a plate block of zirconiferous refractory material such as "Zac" was in need of repair. This zirconiferous refractory has an approximate composition by weight of 10–15% silica, 40–55% alumina and 30–45% zirconia. These bricks were heavily corroded and required cleaning before repair.

A cleaning composition being a mixture of particles was made up as follows (parts by weight):

| | |
|---|---|
| Si | 15 |
| Al | 10 |
| Stabilised zirconia | 30 |
| α-alumina (corundum) | 45 |

The silicon and aluminium fuel particles had a nominal maximum grain size below 45 μm. The average grain size of the silicon was 6 μm. The average grain size of the aluminium was 5 μm. The average grain size of the zirconia was 150 μm, and that of the alumina was 100 μm.

The mixture of particles dispersed in the oxidizing gas was sprayed by the lance 5 shown in FIG. 1. The plate block was at a temperature of approximately 1400° C. The mixture was introduced via the supply tube 10. The central powder outlet 6 was circular and had a diameter of 12.5 mm. The mixture was sprayed at a flow rate of 30 kg/h with oxygen as the oxidizing gas at a rate of 30 $Nm^3/h$. The carrier gas stream comprising the particle mixture and the oxidizing gas struck the surface to be treated at an impact zone. According to the invention this surface was also sprayed with scouring gas jets which impinge upon the surface at regions in the vicinity of and around the impact zone. In this example, the scouring gas jets were formed by oxygen sprayed through the outlets 8 at a pressure of 10 bar. The four outlets 8 each had a circular cross-section and a diameter of 5 mm. The process begins by projecting the powder stream and the four oxygen scouring gas streams at the surface zone to be cleaned and thereafter intermittently projecting the oxygen alone, in order to smooth the surface.

After cleaning of the refractory structure in this way, the powder stream is modified by reducing the level of aluminium to 4 wt. %, the level of silicon to 8 wt. % and by correspondingly increasing the levels of zirconia and alumina. The oxygen scouting stream is turned off. The structure is then repaired by ceramic welding as desired. Thus, the cleaning of the refractory structure and the ceramic welding thereof can be achieved using the same lance and indeed without the need to remove the lance from the furnace between these steps.

EXAMPLE 2

In an aluminium production furnace, a powder stream comprising 30% aluminium and 70% alumina is used to clean an alumina refractory structure at 1000° C. Other conditions were as described in Example 1.

EXAMPLE 3

In this example, a steel converter is treated in the short delay period between two batches. The refractory structure is formed of basic material (MgO). A lance is used having a large output. The diameter of the powder stream discharge orifice is 37.5 mm and the lance is capable of a discharge of 1 tonne/hour of powder. The surface of the refractory is at 1400° C.

The cleaning consists of melting and removing slag. The powder composition is:

| | | |
|---|---|---|
| MgO | 2 mm maximum | 75% |
| Si | 45 μm maximum | 15% |
| Al | 45 μm maximum | 10% |

The scouring gas is oxygen applied at a pressure of 10 bars by way of a number of orifices having a diameter of 5 mm which are so arranged to provide a combined flat flow profile. Thereafter, the cleaned surface is repaired with the same lance (without the scouring gas), using a powder composition:

| | |
|---|---|
| MgO | 82% |
| $ZrO_2$ | 10% |
| Mg/Al alloy | 5% |
| Al | 3% |

as described in British patent specification 2234502-A (Glaverbel & Fosbel International Ltd.).

What is claimed is:

1. A process for cleaning a surface of a refractory structure which is at an elevated temperature, comprising:

projecting against the surface a comburent gas stream which is a powder stream comprised of fuel particles carried in an oxygen-containing carrier gas, the comburent gas stream impinging upon the surface at an impingement zone, whereby the fuel particles are caused or allowed to burn in a reaction zone defined generally around the impingement zone at the surface and heat generated by the combustion of the fuel particles causes the surface or material adhered thereto to melt thus providing a melted material, and projecting a separate scouring stream comprising oxygen simultaneously or alternately at the surface to scour the surface in a vicinity of the reaction zone thereby cleaning the surface due to the scouring stream blowing away the melted material.

2. The process according to claim 1, wherein the surface has a temperature which is greater than 700° C.

3. The process according to claim 1, wherein the scouring stream has a discharge velocity which is greater than that of the powder stream.

4. A process for cleaning a surface of a refractory structure which is at an elevated temperature, comprising:

projecting against the surface a comburent gas stream which is a powder stream comprised of fuel particles carried in an oxygen-containing carrier gas, the comburent gas stream impinging upon the surface at an impingement zone, whereby the fuel particles are caused or allowed to burn in a reaction zone defined generally around the impingement zone at the surface and heat generated by the combustion of the fuel particles causes the surface or material adhered thereto to melt thus providing a melted material, and projecting a separate scouring stream comprising oxygen simultaneously or alternately at the surface to scour the surface in a vicinity of the reaction zone thereby cleaning the surface due to the scouring stream blowing away the melted material, wherein the scouring stream comprises a plurality of streams which are discrete and which are located about the powder stream.

5. The process according to claim 1, wherein the scouring stream has a discharge pressure of at least 7 bar.

6. The process to claim 1, wherein the scouring stream is cold.

7. The process according to claim 1, wherein the powder stream further comprises particles of a refractory oxide.

8. The process according to claim 7, wherein the powder stream comprises at least 20% by weight of the fuel particles, based on a content of solids thereof.

9. The process according to claim 1, wherein the fuel particles are comprised of a material that reacts with the oxygen at the surface to form a refractory oxide having a chemical composition corresponding to that of the refractory structure.

10. The process according to claim 1, wherein the powder stream further comprises a fluxing agent.

11. The process according to claim 1, wherein the scouring stream consists primarily of oxygen.

12. The process according to claim 1, wherein the powder stream and the scouring stream are projected towards the surface by discharge from a common lance.

13. A ceramic welding process in which a coherent refractory mass is formed adherent to a refractory structure at a weld site by projecting a powder stream carrying a mixture of particles which comprises fuel particles and refractory oxide particles against the weld site and the fuel particles are caused or allowed to burn to soften or melt at least the surfaces of the refractory oxide particles so that a coherent refractory mass is formed adherent to the structure, wherein, in a preliminary treatment step, the weld site is cleaned by a process for cleaning a surface of the refractory structure which is at an elevated temperature and which surface includes the weld site, comprising:

projecting against the surface a comburent gas stream which is a powder stream comprised of fuel particles carried in an oxygen-containing carrier gas, the comburent gas stream impinging upon the surface at an impingement zone, whereby the fuel particles are caused or allowed to burn in a reaction zone defined generally around the impingement zone at the surface and heat generated by the combustion of the fuel particles causes the surface or material adhered thereto to melt thus providing a melted material, and projecting a separate scouring stream comprising oxygen simultaneously or alternately at the surface to scour the surface in a vicinity of the reaction zone thereby cleaning the surface due to the scouring stream blowing away the melted material.

* * * * *